United States Patent [19]
Plitzkow

[11] 3,966,027
[45] June 29, 1976

[54] BRAKING APPARATUS FOR STOPPING A ROTATING SHAFT

[75] Inventor: Howard G. Plitzkow, Faribault, Minn.

[73] Assignee: Humphrey Elevator and Truck Company, Faribault, Minn.

[22] Filed: Apr. 4, 1975

[21] Appl. No.: 565,272

[52] U.S. Cl. .................................. 188/182; 188/69
[51] Int. Cl.² ............................................ B60T 7/12
[58] Field of Search ............... 187/89; 188/182, 183, 188/188, 189, 69

[56] References Cited
UNITED STATES PATENTS

| | | | |
|---|---|---|---|
| 2,320,016 | 5/1943 | Severinghaus ..................... | 188/69 X |
| 2,511,793 | 6/1950 | Telbizoff ............................ | 188/182 |
| 2,939,555 | 6/1960 | Flury ................................. | 188/189 X |
| 3,578,817 | 5/1971 | Eastcott ............................. | 188/182 X |

*Primary Examiner*—Duane A. Reger
*Attorney, Agent, or Firm*—Williamson, Bains & Moore

[57] ABSTRACT

Electrically actuated safety apparatus for automatically stopping a rotating shaft at a predetermined rotational speed and adapted for use with rotary components such as those of elevator safety brakes. The apparatus comprises a plurality of rigid, circumferentially spaced stopping blocks which rotate with the shaft, a selectively actuable stopping member, and means for automatically moving the stopping member into engagement with one of the stopping blocks or lugs when the shaft reaches a predetermined, unsafe angular velocity. Shaft velocity is electrically monitored by a proximity switch which senses the speed of the rotating stop lugs and provides an output control signal when an unsafe condition is indicated. The stopping member is shifted to a stop position in the path of the rotating stop lugs by the action of a solenoid which is responsive to the control signal from the proximity switch. Manually operable reset means lock the apparatus in a stopped condition to prevent rotation of the shaft until the stopping member has been retracted to its rest position out of the path of the stop lugs. Failsafe apparatus is included to automatically stop the shaft when power is removed from the proximity switch or malfunction thereof otherwise occurs.

13 Claims, 3 Drawing Figures

BRAKING APPARATUS FOR STOPPING A ROTATING SHAFT

BACKGROUND OF THE INVENTION

Braking mechanisms for stopping rotating bodies are well known in the prior art. Automatic, velocity-responsive braking systems are of particular utility in conjunction with elevator driving mechanisms. A variety of practical and legal considerations make it desirable and necessary for an elevator system to include safety braking apparatus for stopping the elevator car when some part of the system fails. To prevent injury to passengers and to minimize physical structural damage to the elevator system itself the braking system must quickly and reliably decelerate the car. Usually some type of velocity-sensitive governor mechanism is included to trip the braking apparatus in response to a predetermined overspeed condition.

One prior art brake for stopping a rotating body is disclosed in U.S. Pat. No. 1,814,841, issued to U.S. Mosleh on July 14, 1931, wherein a solenoid-actuated plunger is moved into the path of a stop arm in order to stop a rotating wheel. A prior art elevator braking concept utilizes a speedresponsive centrifugal governor to force wedge-shaped or tapered brake shoes into frictional contact with an elevator guide rail to produce controlled deceleration. The latter concept is generally disclosed in U.S. Pat. No. 3,706,361, issued to W. A. Paulssen et al on Dec. 19, 1972, U.S. Pat. No. 3,762,512, issued to R. McIntyre on Oct. 2, 1973, and U.S. Pat. No. 3,799,298, issued to W. Loomer on Mar. 26, 1974. The latter references disclose some form of centrifugal governor which actuates the braking shoes in response to an overspeed condition.

Another prior art form of elevator braking mechanism employs centrifugally actuated stop pawls which are mounted on a rotating member. As the velocity of the rotating member increases, the pawls are urged outwardly into braking contact with a usually stationary stop member. This concept is disclosed generally in U.S. Pat. No. 2,511,697, issued to W. C. Clift on Dec. 12, 1947, U.S. Pat. No. 3,695,399, issued to M. R. Laing on Oct. 3, 1972, and U.S. Pat. No. 3,729,071, issued to M. R. Laing et al on Apr. 24, 1973. The latter two patents are owned by the same assignee as in the instant case. Both of the latter two patents employ centrifugally actuable strike elements or pawls mounted on rotating brake member which are urged outwardly at a predetermined velocity to engage a stationary contact member thereby stopping the rotating body. When the pawls engage the stopping member to stop the rotating body, the resultant shock forces are dampened by the frictional braking surfaces provided by a plurality of interleaved annular driven and driving discs utilized by the brake assembly.

Centrifugal brake acuators, such as the aforementioned pawls or the like, can be disadvantageous in several respects. Centrifugal brake actuating systems will be unreliable unless they receive regular maintenance. Since they will be used so seldom, the effects of corrosion and metal fatigue will vary their response characteristics over time. It can also be very difficult to adjust the speed at which prior art centrifugal governors will actuate. The actuation speed is of course a function of physical characteristics such as length and mass which are not easily varied. Prior art centrifugally actuated pawls can also be disadvantageous because the speed at which they are triggered can vary within wide limits. Speed governors of the latter type also tend to be comparatively slow.

BRIEF SUMMARY OF THE INVENTION

The present invention comprises safety brake apparatus for electrically stopping a rotating shaft. The invention has been designed to obviate the aforementioned difficulties with prior art centrifugal governors and stop mechanisms.

The braking system disclosed herein is adapted for use in conjunction with a variety of rotating members. In the preferred embodiment, however, the apparatus is mounted on an elevator safety brake of the type described in U.S. Pat. No. 3,695,399 in order to obviate the centrifugal pawls employed thereby. The apparatus preferably comprises a plurality of spaced apart stop blocks or lugs which are rigidly associated with an elevator shaft, a rigid, shiftable stop arm which is adapted to selectively contact a stop block in order to stop the rotating shaft, and a proximity device for sensing shaft velocity and actuating the stop arm in response to an overspeed condition. Shaft angular velocity is determined by a proximity sensor which senses rotation of the stop blocks. Electronic module apparatus associated with the proximity sensor generates a control signal responsive to shaft rotational speed. The stop arm is actuated by a solenoid in response to the control signal. When an overspeed condition is sensed by the proximity device, the stop arm will be moved into a stop position in the path of the rotating stop lugs. One of the plurality of rotating lugs will substantially instantaneously engage the stationary stop arm, thereby bringing the shaft to a stop.

The apparatus incorporates a manually operable reset system which locks the stop arm in the lug abutting position and which must be manually reset before resuming rotation. The reset apparatus prevents inadvertent restarts. The stop arm is springably biased toward the stop lug engaging position in order to provide a failsafe feature whereby rotation will be automatically stopped in response to either a power failure or proximity circuit malfunction.

A particularly advantageous aspect of my invention is that, unlike prior art centrifugal governors, the apparatus disclosed herein can be programmed to actuate at a particular unsafe velocity. The electronic circuitry associated herewith limits the trigger velocity within precise limits.

Another advantage realized with my invention is that brake actuation occurs almost instantaneously in response to an overspeed condition. The latter is facilitated by the electronic sensing circuitry which obviates the time delay associated with mechanical governors.

Yet another significant advantage realized with my speed control apparatus is that the trigger speed can be easily varied. The latter feature is accomplished simply by varying parameters within the electronic proximity control apparatus. This is quicker and more efficient because unlike prior art centrifugal pawls which must either be replaced or tediously adjusted by manipulation of bias springs associated therewith, simple manipulation of a potentiometer can vary the trigger velocity in the device of this invention.

Another particular advantage of my invention is that it may be employed in conjunction with a wide variety of rotational apparatus. It is particularly well adapted for use with elevator brakes of a character described later herein.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 3 is a schematic wiring diagram of an elevator control system incorporating the instant invention.

DESCRIPTION OF THE PREFERRED EMBODIMENT

Figure 1:
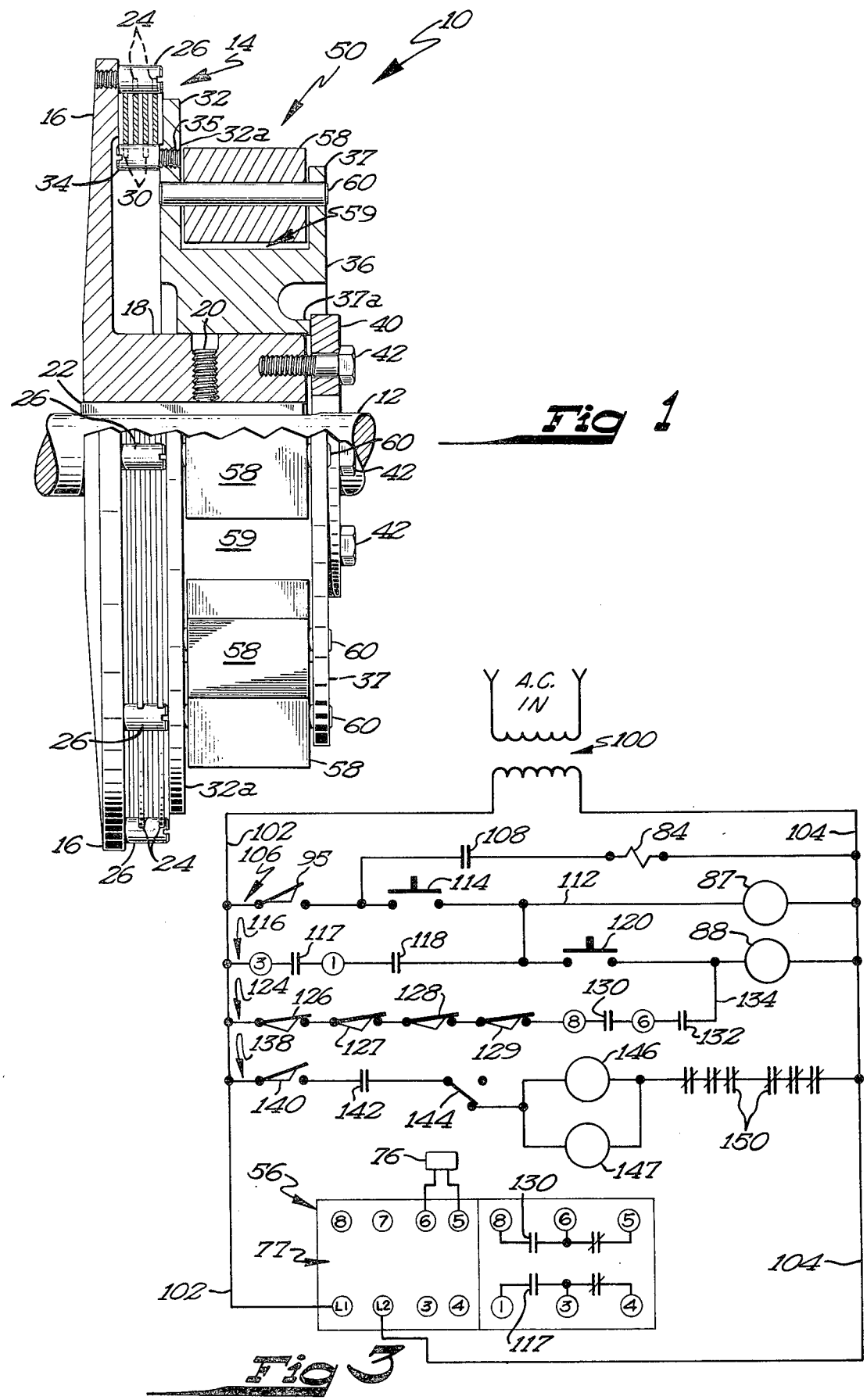
FIG. 1 is a partially cut away side view of a rotary elevator brake having the instant invention mounted thereon.

Referring now to the drawings, FIG. 1 shows an overspeed safety brake identified generally by the reference numeral 10. Brake 10 is similar to overspeed saftey brakes shown in U.S. Pat. No. 3,695,399, issued to M. R. Laing on Oct. 3, 1972 and U.S. Pat. No. 3,729,071 issued to M. R. Laing et al on Apr. 24, 1973. Both of these patents incorporate centrifugal governors comprising arcuate pawls which are tripped mechanically in response to a predetermined shaft speed to engage a stationary stop plate. These patents are hereby incorporated by reference to show the remaining brake structure which is common to that disclosed in FIG. 1. U.S. Pat. No. 3,695,399 is also incorporated by reference to illustrate a manlift elevator with which the stop mechanism disclosed herein may be used. Both of the aforementioned patents are owned by the same assignee as set forth herein.

Although discussed in detail in the previously mentioned patents, the major structural elements of the safety brake apparatus will be briefly discussed here for convenience. Brake assembly 10 is mounted on a drive shaft 12 which interconnects the brake with a rotary member of the elevator drive mechanism. Brake 10 includes a disc brake assembly 14 comprising a circular plate 16 which has an elongated hub portion 18 integral therewith. Hub 18 is rigidly fastened to shaft 12 by a set screw 20 which forces a key 22 in abutment with shaft 12. A first plurality of driving brake discs 24 are coupled to annular member 16 at its outer periphery by a plurality of elongated connectors 26. Annular driving discs 24 thus rotate with member 16 and are in substantially parallel relationship therewith.

Driven discs 30 are coupled to an annular wall portion 32 by a second set of elongated connectors 34, which have a lesser diameter threaded portion 35 anchored within portion 32. Member 32 has an elongated hub portion 36 integral therewith which rearwardly abuts a larger diameter circular flange 37.

Annular member 32 is adapted to move axially with respect to shaft 12 in response to pressures applied thereto by a mechanically actuable, annular braking ring 40 which bears against the outer end surface 37a of flange 37. The clamping ring 40 is attached at the rearward end of the brake by a plurality of circumferentially spaced apart cap screws 42 which penetrate member 37 and are received within hub 18. When tightened the screws 42 will move annular member 32 toward member 16. As a result, the interleaved braking discs will be compressed into frictional engagement thereby coupling member 16 to member 32. In the previously discussed patents, member 36 is provided with a plurality of arcuate, centrifugally actuated stopping pawls which, in response to predetermined rotational velocity of the annular portion 32, will be deflected outwardly into engagement with stationary stop members to thereby stop rotating portion 16 (and shaft 12). The centrifugal pawls are described in detail in the previously cited patents. Because of the frictional coupling provided by interleaved frictional plates 24 and 30, the tremendous shock forces induced in rotating member 32 upon actuation of the stopping mechanism do not adversely affect member 16.

The safety braking apparatus disclosed herein and generally indicated by the reference numeral 50 provides an improved replacement for the centrifugally operated mechanical stopping pawls utilized by prior art safety brakes. Of course this apparatus may be of utility in conjunction with a wide variety of rotating bodies. The braking apparatus 50 comprises a stop means 52 which is rotated by shaft 12, a displaceable means 54 for engaging the stop means to thereby stop rotation of shaft 12, and a proximity means 56 for actuating the engaging means 54 when the shaft reaches a predetermined angular velocity or rotational speed.

Stop means 52 preferably comprises a plurality of circumferentially spaced apart stopping lugs 58 which are symetrically and rigidly mounted upon the periphery of hub 36 within the recessed area 59 (FIG. 1) defined between wall portion 32a and flange member 37. The blocks 58 preferably comprise rigid, metallic cubes which are mounted by studs 60 (FIG. 2) which extend therethrough and are anchored within plate 37 and wall 32a. While in the preferred embodiment eight equally spaced stopping blocks or lugs are utilized, a differing number of lugs will produce satisfactory results. Also, it is apparent that rotating stop lug means could comprise, for example, a raised notch portion integral with flange 37.

The engaging means preferably comprises a rigid, elongated stop arm 62 which may be deflected into engagement with one of the rotating stop lugs 58 to stop rotation of hub 36. Stop arm 62 is preferably pivotally mounted to a rigid frame member 64 via a pin 66 defining a horizontal pivot axis. Frame member 64 is integral with a stationary frame member 70, which has a vertically upright stanchion portion 72 attached thereto. Portions 70 and 72 preferably comprise rigid structural steel beams. When displaced leftwardly (as viewed in FIG. 2) the upper end 62a of arm 62 will come into abutment with a passing stop lug 58, thereby almost instantaneously stopping hub 36. Because of the braking action of the previously described braking disks, rotating member 16 and shaft 12 will come to a controlled, graduated stop.

Proximity means 56 is operable to monitor shaft angular velocity, and when a predetermined shaft velocity occurs, to cause the displacement of stop arm 62 into the path of one of the stop lugs 58 to stop the shaft 12. Of course with the environmental structure shown in FIG. 1, the shaft 12 will be stopped indirectly via the frictional braking discs discussed earlier. Proximity means 56 senses rotational velocity through a sensing head 76 which is preferably mounted in close proximity to the stop lugs 58 such that, as the stop lugs rotate, electrical impulses will be generated within the head 76. Head 76 is preferably mounted via a pair of angle brackets 79 and 79a to the rigid stanchion 72. Proximity means 56 also comprises an output relay 77 and an electronic module 78 to which sensing head 76 is interconnected via a conduit 80. Module 78 contains electronic circuitry suitable for generating a control signal in response to rotational velocity sensed by head 76. The control signal actuates relay 77. Head 76, relay 77 and module 78 comprise elements of a proximity switch which is commercially available from the Micro Switch Company of Freeport, Ill., and identified by their Catalog No. FMA 111U1-VA. A Honeywell type PK-8223-3 proximity switch may alternatively be utilized. The said proximity switch is housed within a preferably metallic, cubical housing structure 82.

A solenoid 84 is interconnected to stop arm 62 via an elongated plunger member 86 which extends through stanchion 72 and is rigidly attached to the stop arm 62. In the preferred embodiment solenoid 84 is housed within enclosure 82. Solenoid 84 is in effect responsive to the control signal generated by the proximity module 78. As will be described in more detail later in conjunction with FIG. 3, the control signal actuates output relay 77 (included within the commercially available proximity means) to actuate a pair of relays 87 and 88 which thereby de-energize solenoid 84.

Figure 2:
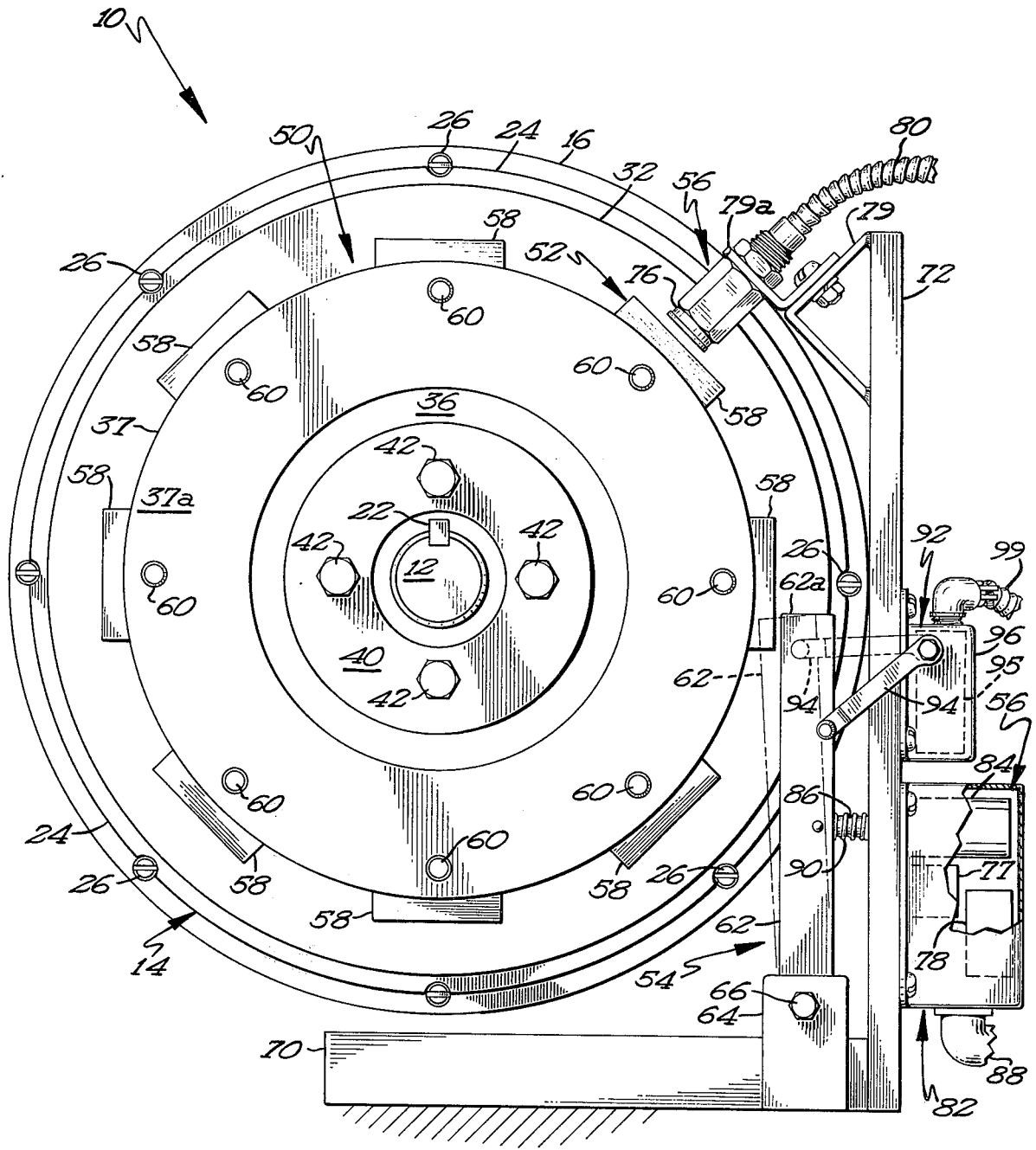
FIG. 2 is an end view of the apparatus taken along lines 2—2 of FIG. 1.

In the preferred embodiment the stop arm is not actuated until solenoid 84 is de-energized whereupon the stop arm will be deflected into engagement with the stop means by a spring 90 which biases the stop arm 62 toward the rotating stop lugs. Spring 90 is preferably operatively associated with the solenoid 84, being wrapped around plunger 86 and extending between stop arm 62 and stanchion 72. As long as solenoid 84 is energized, plunger 86 will be pulled to the right by the solenoid 84 thereby overcoming the tension of spring 90 and holding arm 62 out of contact with the rotating stop lugs. In FIG. 2, stop arm 62 is shown in its retracted rest position, out of the path of rotating lugs 58. The rotational velocity at which the control signal goes low is determined by the control module and it can be electrically changed by varying circuit parameters.

Spring 90 thus provides a failsafe means whereby the stop arm 62 will be actuated in the event of a primary power failure, or if a circuit failure develops within the control module 78. However, as long as uninterrupted primary power service continues and as long as the circuit module functions correctly, the arm 62 will be urged by solenoid 74 against predetermined spring tension toward the rightward position (as viewed in FIG. 2).

A reset means 92 is provided to lock stop arm 62 in the stopped position such that end 62a of stop arm 62 will be maintained in contact with a stop lug 58 until the reset means 92 is manually disengaged. Reset means 92 includes a pivot arm 94 which actuates an associated control switch 95 (FIG. 3) within a preferably metallic, generally cubical housing 96. Housing 96 is preferably rigidly mounted to stanchion 72. Arm 94 is normally maintained in a downwardly angled position by stop arm 62. However, when stop arm 62 is urged into abutment with the stop means to stop the shaft, arm 94 will be deflected upwardly into the position shown by dotted lines. At this time arm 94 will extend generally horizontally thereby maintaining stop arm 62 in abutment with one of the stop lugs 58. At this time switch 95 (FIG. 3), which is electrically interconnected with the module 78 via a conduit 99, will turn off the proximity means to protect the circuitry therein when rotation has been stopped. Before rotational opertion can again begin, reset arm 94 must be manually deflected to its downwardly angled position. It is apparent that reset means 92 will be operational in the event of a power failure and it is not dependent upon operation of the proximity means.

In the electrical diagram of FIG. 3 the aforementioned braking apparatus is shown for illustrative purposes in conjunction with a prior art elevator electrical control system. It should be understood that the safety braking apparatus herein disclosed is not limited to the particular environment shown in FIG. 3.

Primary power is supplied through a transformer 100 across lines 102 and 104 between which a plurality of circuit legs extend. Lines 102 and 104 are also connected to terminals L1 and L2 respectively of the proximity switch within housing 82. Terminals 5 and 6 of the proximity switch interconnect with sensor head 76. The remaining illustrated terminals interconnect with the circuitry at nodes identified by similar numerals.

Circuit leg 106 comprises stop arm limit switch 95 which is actuated by reset arm 94 and housed within enclosure 96. Switch 95 connects with solenoid 84 through relay contacts 108. Contacts 108 are actuated by a relay 87 which connects to switch 95 via a line 112 and a push button switch 114. Circuit leg 116 includes proximity relay contacts 117 (connected through proximity switch terminals 1 and 3) and contacts 118, which are actuated by relay 87 in circuit leg 106. A push button switch 120 is connected to contacts 118 and to relay 88 which is returned to line 104. Relay 77 (part of proximity means 82) thus indirectly controls solenoid 84 through contacts 117, relay 87 and contacts 118. Since, as explained earlier, relay 77 is actuated by the control signal generated by module 78, solenoid 84 is thus responsive to the control signal.

Circuit leg 124 comprises mercury tilt switches 126 and 127, rail stop switches 128 and 129, proximity switch contacts 130 (which are across proximity switch nodes 8 and 6), and relay contacts 132, which are connected to relay 88 via a line 134. Contacts 132 are actuated by relay 88. Circuit leg 138 comprises a tilt switch 140, relay contacts 142 (which are also actuated by relay 88), phase reversal relay 144, a pair of paralleled drive motor starters 146 and 147, and a plurality of series connected, normally closed relay contacts 150.

When the shaft 12 is rotating, switch 95 is closed and solenoid 84 is energized through relay contacts 108 thereby maintaining stop arm 62 away from the rotating stop lugs. When an overspeed condition is sensed by head 76, the proximity switch contacts 117 and 130 will open, removing power from relay 87 thereby deenergizing solenoid 84 by opening contacts 108. When this happens, spring 90 urges stop arm 62 to the left into the path of the rotating stop lugs 58. (Push button switches 114 and 120 are spring biased in the open position). Opening of proximity switch contacts 130 will remove power from relay 88 thereby opening contacts 132 and 142. Opening of switch contacts 142 will remove power from the drive motors. As soon as stop arm 62 moves into the stop lug engaging position and contacts one of the lugs 58, thereby interrupting rotation, switch 95 will be opened as reset arm 94 moves into the upward horizontal position. (FIG. 2).

Before resuming operation, switch 95 must be reset by manually moving arm 94 to the lowermost angular position and switch 114 must be manually depressed to energize relay 87 and thereby energize solenoid 84 through switch contact 108. Similarly, switch 120 must be manually reset to re-energize relay 88 and again close contacts 132 and 142. Contacts 132 will thereby latch relay 88 in the "on" position and contacts 142 will enable operation of circuit leg 138. Of course the remaining switch contacts, such as the mercury tilt switches for example, must be enabled if they were triggered. When rotation again begins the proximity means will again operate in the manner described and provide a constant overspeed sensing feature. In the event of a malfunction of a proximity switch, or if power is removed from lines 102 and 104, it is apparent that solenoid 84 will become de-energized and stop arm 62 will stop the apparatus in the failsafe manner previously described.

I anticipate that numerous and varied changes may be made in the form and assembly of my safety braking apparatus without departing from the spirit and scope of my invention as defined by the following claims:

What is claimed is:

1. Safety braking apparatus for stopping a rotating shaft, said apparatus comprising:
   rigid stop lug means associated with said shaft for rotation thereby;
   displaceable means for selectively engaging said stop lug means; and
   proximity means for electrically actuating said displaceable engaging means at a predetermined angular velocity of said shaft, said proximity means comprising:
   means for generating an electrical control signal in response to rotation of said stop lug means, and solenoid means for actuating movement of said engaging means into abutment with said stop lug means in response to said control signal, said solenoid means normally operable to hold said displaceable engaging means in a rest position.

2. The combination as in claim 1 wherein said stop lug means comprises a plurality of circumferentially spaced apart stop blocks, and said engaging means comprises a rigid stop arm pivotally moveable from a rest position into the rotational path of said stop means for abutting engagement therewith.

3. The combination as in claim 2 wherein said proximity means comprises sensing head means for sensing rotation of said stop lug means, said sensing head means electrically connected to said generating means.

4. The combination as in claim 2 including manually releasable reset means for automatically locking said stop arm in abutment with said stop means when said stop arm is actuated.

5. The combination as in claim 4 including failsafe means for deflecting said arm into abutment with said stop means in response to a power failure or failure of said proximity means, thereby stopping said shaft.

6. The combination as in claim 5 wherein said failsafe means comprises spring means mechanically associated with said stop arm for biasing said stop arm toward said stop lug means.

7. In an elevator braking apparatus comprising a first hub portion for rotation by a shaft, a second rotatable hub portion, and brake disc means for selectively, frictionally coupling said second hub portion to said first hub portion, the improvement comprising:
   rigid stop lug means associated with said shaft for rotation thereby;
   displaceable means for selectively engaging said stop lug means; and
   proximity means for electrically actuating said displaceable engaging means at a predetermined angular velocity of said shaft, said proximity means comprising:
   means for generating an electrical control signal in response to rotation of said stop lug means; and solenoid means for actuating movement of said engaging means into abutment with said stop lug means in response to said control signal, said solenoid means normally operable to hold said displaceable engaging means in a rest position.

8. The improvement as in claim 7 wherein said stop means comprises a plurality of rigid, circumferentially spaced apart stop lugs fixedly mounted on said second hub portion.

9. The improvement as in claim 7 wherein said engaging means comprises a rigid stop arm adapted to be pivotally displaced from a rest position into the path of said stop means for abutting engagement therewith.

10. The improvement as in claim 9 wherein said proximity means comprises sensing head means for sensing the rotational speed of said stop lug means, said sensing head means electrically connected to said generating means.

11. The improvement as in claim 9 including manually releasable reset means for automatically locking said stop arm in abutment with said stop means when said stop arm is actuated.

12. The improvement as in claim 11 including failsafe means for stopping said shaft by deflecting said arm into engagement with said stop means in response to a power failure or failure of said proximity means.

13. The improvement as in claim 12 wherein said failsafe means comprises spring means for biasing said stop arm toward said stop means.

* * * * *